(12) United States Patent
Wojciechowski et al.

(10) Patent No.: US 6,210,283 B1
(45) Date of Patent: Apr. 3, 2001

(54) COMPOSITE DRIVE SHAFT

(75) Inventors: Charles R. Wojciechowski, West Chester; Gary M. Holloway, Cincinnati, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/182,192

(22) Filed: Oct. 30, 1998

(51) Int. Cl.$^7$ ................................................ F16C 35/08
(52) U.S. Cl. ........................... 464/181; 464/183; 464/182
(58) Field of Search .................................... 464/183, 179, 464/181, 88, 182, 902, 903, 79

(56) References Cited

U.S. PATENT DOCUMENTS

| | | |
|---|---|---|
| 2,380,952 * | 8/1945 | Dewey ................................. 464/182 |
| 4,259,382 | 3/1981 | Schwan . |
| 4,265,951 | 5/1981 | Yates et al. . |
| 4,605,385 | 8/1986 | Puck et al. . |
| 4,664,644 | 5/1987 | Kumata et al. . |
| 4,838,833 | 6/1989 | Coursin . |
| 4,932,924 | 6/1990 | Lobel . |
| 5,106,442 | 4/1992 | Corr . |
| 5,230,661 | 7/1993 | Schreiber et al. . |
| 5,277,661 * | 1/1994 | Mak et al. ........................... 464/183 |
| 5,342,464 | 8/1994 | McIntire et al. . |
| 5,419,868 * | 5/1995 | Honnorat ................................ 419/4 |
| 5,421,781 | 6/1995 | Mackellar . |
| 5,511,604 * | 4/1996 | Ravenhall et al. ..................... 164/97 |
| 5,724,643 * | 3/1998 | Ewing ..................................... 419/8 |

* cited by examiner

Primary Examiner—Lynne H. Browne
Assistant Examiner—Aaron Dunwoody
(74) Attorney, Agent, or Firm—Andrew C. Hess; Rodney M. Young

(57) ABSTRACT

A gas turbine engine drive shaft includes a tubular main shaft and an annular end fitting disposed coaxially therewith. The shaft and fitting have corresponding ends abutting at a joint. An annular collar surrounds the shaft and fitting over the joint and is bonded thereto for carrying torsional, tensile, and bending loads across the joint. In this way, a composite main shaft may be joined to a monolithic end fitting.

20 Claims, 2 Drawing Sheets

COMPOSITE DRIVE SHAFT

The Government has rights in this invention pursuant to Contract No. F33615-94-2-4439 awarded by the Department of the Air Force.

BACKGROUND OF THE INVENTION

The present invention relates generally to gas turbine engines, and, more specifically, to rotors or drive shafts therein.

An aircraft turbofan gas turbine engine includes in serial flow communication a fan, compressor, combustor, high pressure turbine (HPT), and low pressure turbine (LPT). The fan is joined to the LPT by one drive shaft, and the compressor is joined to the HPT by another drive shaft disposed concentrically around the first drive shaft.

In operation, air passes through the fan and is pressurized in the compressor, and mixed with fuel in the combustor and ignited for generating hot combustion gases which flow downstream through the HPT and LPT which extract energy therefrom for in turn powering the compressor and fan, respectively. Both drive shafts are subject to heating by the combustion gases, with the LPT drive shaft experiencing a lower temperature than the HPT drive shaft.

Accordingly, the drive shaft must be formed of suitable high temperature, high strength materials for carrying loads during operation at the elevated temperatures. Both shafts are subject to torsion loads as the turbines drive the corresponding fan and compressor. The pressure forces acting across the fan, compressor, and turbines place the corresponding drive shafts under tension during operation. Arid, the drive shafts are also subject to bending and gravity loads as the engine elastically deflects during aircraft movement.

The LPT drive shaft extends substantially the full axial length of the engine between the fan and the LPT and is therefore relatively long and slender and is subject to considerable torsional, bending, and tensile loads during operation at elevated temperature. The drive shaft is therefore made of a suitable high strength material which can maintain its strength at the elevated temperatures experienced during operation. At elevated temperature, creep strength is important which allows the drive shaft to withstand high loads at elevated temperature without undesirable creeping which would substantially limit the useful life of the drive shaft.

Accordingly, the LPT drive shaft is typically manufactured as a unitary, one-piece component of a suitable monolithic material such as a high strength nickel alloy for providing sufficient stiffness and strength, including creep strength, fatigue strength, and yield strength, for use in the hostile environment of a gas turbine engine. The opposite axial ends of the drive shaft are configured in suitable fittings for permitting mechanical attachment to the fan rotor at one end, and the LPT rotor at the opposite end. The fan fitting is typically accomplished by providing an external spline on the drive shaft which engages an internal spline in the fan rotor. And, the turbine fitting is typically configured as a radial flange at the end of the drive shaft which is bolted to a corresponding flange on the LPT rotor.

Furthermore, the LPT drive shaft must be dynamically balanced for reducing vibration during operation, which is typically accomplished by providing two or more annular balance lands integral in the drive shaft from which material may be precisely removed to balance the entire drive shaft.

The resulting LPT drive shaft is therefore effective for accommodating the various loads experienced during operation, and at elevated temperature, but has a substantial weight. Since an aircraft engine powers an aircraft in flight, engine weight is a primary design concern and should be as low as possible without comprising engine structural integrity.

Various forms of composite materials are being developed for use in aircraft gas turbine engines for reducing the overall weight thereof while maintaining suitable strength under the specific operating environment thereof. However, composite materials have various limitations which complicate their use in a gas turbine engine. For example, composite materials typically do not enjoy comparable strength with their monolithic metallic counterparts at the required mechanical joints in the engine such as bolted flange joints or spline joints.

Accordingly, it is desired to provide an improved gas turbine engine drive shaft having reduced weight while maintaining stiffness and strength at elevated temperature, and including suitable mechanical joints for connection with adjoining components.

BRIEF SUMMARY OF THE INVENTION

A gas turbine engine drive shaft includes a tubular main shaft and an annular end fitting disposed coaxially therewith. The shaft and fitting have corresponding ends abutting at a joint. An annular collar surrounds the shaft and fitting over the joint and is bonded thereto for carrying torsional, tensile, and bending loads across the joint. In this way, a composite main shaft may be joined to a monolithic end fitting.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
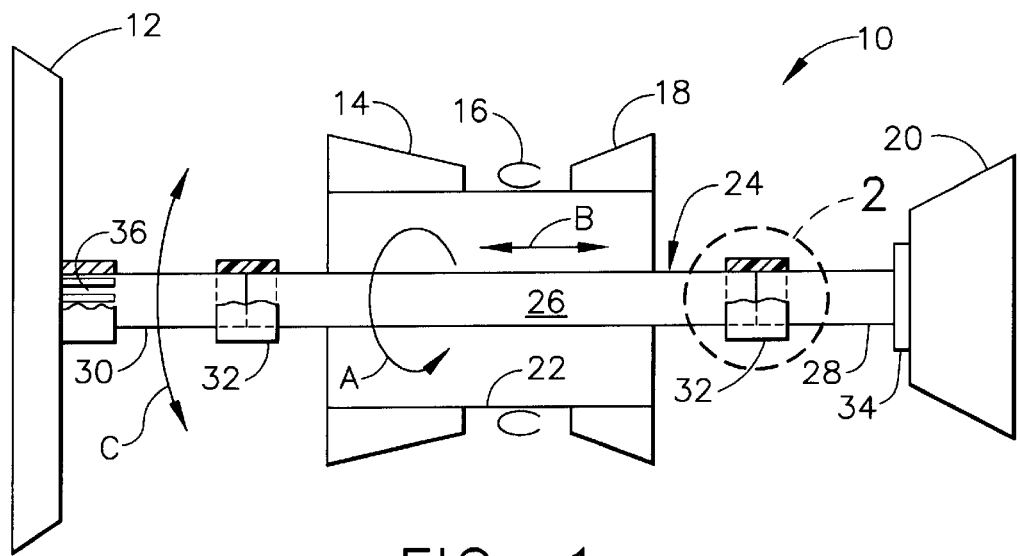
FIG. 1 is an axial schematic view of an aircraft turbofan gas turbine engine having a drive shaft in accordance with an exemplary embodiment of the present invention.

Illustrated schematically in FIG. 1 is an exemplary aircraft turbofan gas turbine engine 10. The engine is axisymmetrical about a longitudinal or axial centerline axis and includes in serial flow communication a fan 12, compressor 14, combustor 16, high pressure turbine (HPT) 18, and low pressure turbine (LPT) 20. The rotor of the HPT 18 is joined to the compressor 14 by one drive shaft 22, and the rotor of the LPT 20 is joined to the rotor of the fan 12 by another drive shaft 24 configured in accordance with one embodiment of the present invention.

But for the LPT drive shaft 24, the engine 10 is otherwise conventional in configuration and operation. During operation, air flows past the fan 12 and is pressurized in the compressor 14, and mixed with fuel in the combustor 16 and ignited for generating hot combustion gases which flow downstream through the HPT 18 and LPT 20 which extract energy therefrom. The HPT rotates the outer drive shaft 22 for powering the compressor 14, and the LPT 20 rotates the inner drive shaft 24 for powering the fan 12.

The LPT drive shaft 24 must therefore have sufficient stiffness and strength for accommodating torsional loads A, tensile loads B, bending loads C, and vibratory excitation which are generated during operation of the engine 10 in powering an aircraft (not shown) in flight and at the elevated temperatures due to the generated combustion gases. For example, the drive shaft 24 must have sufficient creep strength for accommodating the various loads at elevated temperature for obtaining a useful life of the drive shaft during operation. And, the drive shaft 24 must be suitably configured for being mechanically attached at both ends to the fan 12 and the LPT 20, also with sufficient strength.

As initially shown in FIG. 1, the drive shaft 24 includes a tubular center or main shaft 26 and a pair of annular end fittings 28,30 disposed coaxially with the main shaft. A pair of annular sleeves or collars 32 axially bridge and preferably surround the shaft and corresponding fittings and are bonded thereto for effecting a unitary drive shaft 24 for carrying the torsional, tensile, and bending loads therethrough.

The first end fitting 28 is bonded to one end of the main shaft 26 using one of the collars 32, and is specifically configured for being fixedly joined to the rotor of the LPT 20. For example, the first end fitting 28 may have an integral radial flange 34 at one end for bolting the end fitting to the turbine rotor in a conventional manner. Or, a spline joint may be substituted.

The second end fitting 30 is bonded to an opposite end of the main shaft 26 using the second collar 32 and is suitably configured for being fixedly joined to the rotor of the fan 12. For example, the second fitting 30 may have an external spline 36 configured to engage a complementary internal spline in the fan rotor in a conventional manner. Or, a flange joint may be substituted.

In this way, both end fittings 28,30 may be conventional in most part for fixedly joining the drive shaft 24 to the fan 12 and LPT 20 and for carrying the various loads during operation at elevated temperature with strength comparable to a conventional drive shaft. However, the main shaft 26 joined to the disparate end fittings by the respective collars, may be optimized in accordance with the present invention for substantially reducing its weight while maintaining sufficiently high strength for carrying the torsional, tensile, and bending loads during operation at elevated temperature.

Figure 2:
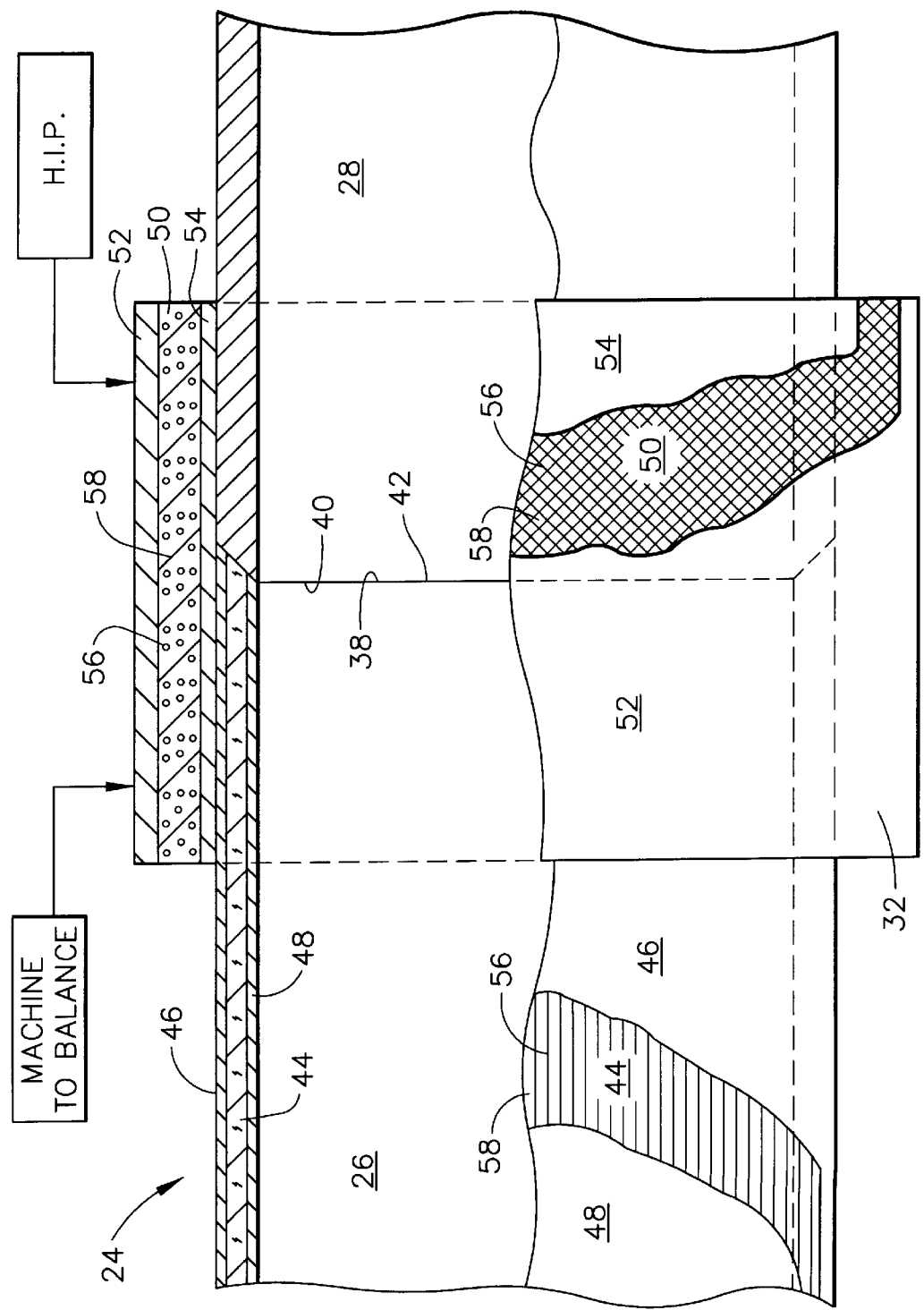
FIG. 2 is an enlarged portion of the LPT drive shaft illustrated in FIG. 1 within the dashed circle labeled 2.

FIG. 2 illustrates in more particularity the first end fitting 28 joined to the main shaft 26 by the collar 32, with a substantially identical joint also being provided at the second end fitting 30. The main shaft 26 has opposite axial ends 38 which correspondingly abut opposing ends 40 of the respective fittings 28,30 at corresponding end joints 42 defined thereat. The collars 32 are bonded to the main shaft and end fittings at the respective joints 42 for carrying torsional, tensile, and bending loads across the respective joints.

The main shaft 26 preferably includes a tubular core 44, and radially outer and inner tubular shells 46,48 integrally bonded to the core 44 to form a unitary, one-piece main shaft 26. The collar 32 preferably includes a tubular core 50, and radially outer and inner tubular shells 52,54 integrally bonded thereto.

In the preferred embodiment illustrated in FIG. 2, the shaft and collar cores 44,50 are metal matrix composites having high stiffness and strength at elevated temperature, including relatively high creep strength, at reduced weight compared to the conventional monolithic metal drive shaft. The shaft shells 46,48 and collars shells 52,54 are preferably monolithic metal. And, the respective end fittings 28,30 are also preferably monolithic metal.

For example, the end fittings may be formed of conventional metal such as titanium or nickel alloy being similarly sized in comparison with a conventional turbine drive shaft for being fixedly joined by the flange 34 to the LPT 20, and by the spline 36 to the fan 12. Significant weight reduction in the overall drive shaft 24 may be effected by maximizing the axial length of the main shaft 26 and minimizing the axial length of the corresponding end fittings 28,30.

However, weight reduction of the drive shaft 24 cannot compromise the required strength of the drive shaft for its intended use in the hostile environment of the gas turbine engine. Accordingly, the shaft and collars cores 44,50 preferably include reinforcing, high strength structural fibers 56 in an integral metal matrix 58. The resulting metal matrix composite (MMC) cores 44,50 provide high strength with minimum weight, with a weight reduction compared with conventional monolithic metal, such as a nickel alloy.

The orientation of the fibers 56 in the metal matrix 58 of both the shaft core 44 and the collar core 50 may be selected as desired for maximizing the load carrying capability thereof in preferred directions. For example, the fibers 56 in the shaft core 44 illustrated in FIG. 2 may extend primarily only in the axial direction in a suitable number of plies for providing substantial tensile load carrying capability. Since the main shaft 26 is tubular and the fibers are dispersed circumferentially around the perimeter thereof, the shaft also enjoys substantial bending load capability and torsional load capability.

Correspondingly, the fibers 56 of the collar core 50 may be preferentially oriented in generally opposite 45° directions relative to the axial direction in a suitable number of plies. The axial length of the collar 32 is preferably limited and is only as large as necessary for bridging the corresponding ends of the main shaft 26 and the end fittings 28,30, and as required for balancing. The skewed fibers 56 therein maximize the load carrying capability thereof in torsion, tension, and bending as these loads are carried therethrough between the ends of the fittings and the main shaft.

Suitable metal matrix composites are commercially available. For example, the reinforcing fibers 56 may be silicon coated carbon or tungsten fiber cores integrally formed in a titanium matrix. This MMC and others are commercial available from Textron, Inc., Lowell, Mass.; Atlantic Research Co., Wilmington, Mass.; and 3M Company, Minneapolis, Minn. They have a modulus of elasticity of about $29-32 \times 10^6$ psi, for example, which is about double that of a conventional monolithic titanium drive shaft. The drive shaft may therefore be made thinner and lighter for comparable strength.

However, the MMC cores 44,50 must be suitably joined to the two end fittings 28,30 for providing the complete drive shaft 24, whose collective strength must be at least that of the conventional metal drive shaft being replaced. It is noteworthy that the conventional monolithic drive shaft made of titanium, for example, is a one-piece component for providing suitable strength at elevated temperature, including creep strength. Joints therein are not preferred since they can reduce the strength of the drive shaft thereat, and would fail to achieve acceptable creep strength therein.

Accordingly, the configuration of the collars 32 surrounding the respective end joints 42, and the bonding thereof are important for effecting suitable strength thereat for withstanding the hostile environment in the engine.

Figure 3:
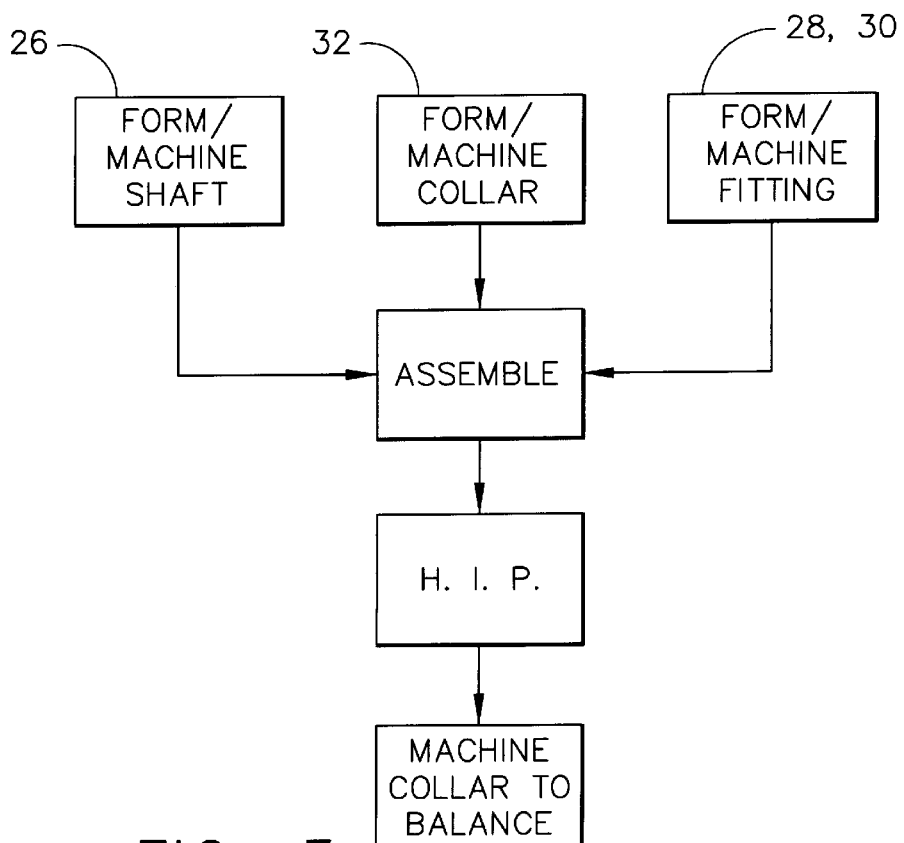
FIG. 3 is a flowchart representation of an exemplary method of making the LPT drive shaft illustrated in FIGS. 1 and 2.

FIG. 3 illustrates in flowchart form an exemplary method of making the drive shaft illustrated in FIGS. 1 and 2. The individual end fittings 28,30 are separately formed and machined in any conventional manner. The MMC main shaft 26 and collars 32 are also separately formed.

This may be accomplished by forming sheet metal, Titanium for example, over a cylindrical mandrel to lay up the respective inner shells 48,54 in tubular form. The cores 44,50 are then laid up over the respective inner shells 48,54. And then additional sheet metal is laid up over the respective cores 44,50 to form the outer shells 46,52. Each of the resulting preforms for the main shaft 26 and collars 32 is then bonded together using conventional hot isostatic pressing (HIP) for example.

The bonded main shaft and collars are then separately machined to final dimensions for assembly. The respective end fittings 28,30 are assembled to the opposite ends of the main shaft 26 and preferably bonded thereto by conventional inertia welding or explosive bonding for example.

The respective collars are positioned around the respective end joints 42, and bonded to the main shaft and end fittings again using HIP for example. The order of assembly and bonding may be varied as required for completing the drive shaft 24.

The main shaft 26, end fittings 28,30, and collars 32 are preferably hot isostatically pressed together since this is accomplished without melting the parent material and provides a resulting bond at the end joints 42 and with the collars 32 which is integral and without an undesirable heat affected zone. The resulting joint at the collars effects a unitary assembly for maximizing strength thereof, including creep strength.

Referring again to FIG. 2, the main shaft 26 and end fittings 28,30 preferably have a common or substantially equal outer diameter at the respective joints 42. Each of the collars 32 preferably has an inner diameter substantially equal to the outer diameter of the shaft and fittings in a line-to-line contact, or interference fit if practical. In this way, the collars preferably surround the main shaft and end fittings. Alternatively, the collars may be sized to fit inside the shaft and fittings. After the collars are integrally bonded to the pre-joined main shaft and end fittings using HIP, a unitary, or one-piece assembly of the drive shaft 24 is formed.

The inner and outer shells of the main shaft 26 and collars 32 are provided to protect the integrity of the corresponding MMC cores 44,50 laminated therebetween, and to provide a suitable machining surface for achieving the required radial dimensions of the drive shaft 24. Since the drive shaft 24 is positioned inside the engine 10, and is suitably supported by bearings (not shown), its outer configuration may vary as desired for being mounted inside the engine with precision. Since the shells are preferably formed of a monolithic metal, like titanium for example, they are readily machinable. And, the shaft outer shell 46 and the collar inner shell 54 may be readily machined to substantially equal diameters in the preferred line-to-line contact prior to assembly thereof.

The shaft end 38 and the fitting end 40 as illustrated in FIG. 2 are preferably complementarily beveled, at about 45° for example, for maximizing the contact area therebetween and the resulting integral bond thereat for carrying loads therethrough.

In the preferred embodiment illustrated in FIG. 2, the end fitting 28 is preferably tubular where it joins the main shaft 26 for additionally minimizing weight, and has a common inner diameter with the main shaft. In the preferred embodiment, the wall thicknesses of the main shaft 26 and end fittings 28,30 at the respective joints 42 are substantially equal, and therefore the beveled ends 38,40 are used for increasing the surface area and bond therebetween.

An additional advantage of using the monolithic collar outer shell 52 is that it may be suitably thick for allowing machining thereof for balancing the entire drive shaft 24. Accordingly, the collar outer shell 52 is preferably thicker than the shaft outer shell 46 for providing a machinable land for balancing the drive shaft. For example, the thickness of the shaft outer shell 42 may be about 0.25–0.38 mm for example, whereas the collar outer shell 52 is suitably thicker, for example about 1.5 mm for allowing sufficient material removal to balance the drive shaft, typically using both collars 32 spaced apart at opposite ends of the drive shaft.

The resulting composite drive shaft 46 is effectively a unitary, one-piece assembly of the main shaft 26, end fittings 28,30, and corresponding collars 32 due to the hot isostatic pressing which forms metallurgical bonds without melting of the parent material and without undesirable heat affected zones. This allows the majority of the drive shaft between the end fittings to be formed of a suitable metal matrix composite with outer and inner machinable shells for substantially reducing drive shaft weight while maintaining strength thereof for the hostile environment of the gas turbine engine. For example, improved creep strength, fatigue strength, and yield strength are obtained, and the drive shaft is substantially stiffer than the conventional monolithic metal shaft for obtaining higher resonant frequencies.

The outer profile of the drive shaft 24 may be otherwise conventional as required for being mounted inside the available space in the engine, with only the two collars 32 locally changing the low profile of the drive shaft. The two collars 32 are additionally used to advantage for providing balancing lands which may be suitably machined for balancing the drive shaft.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine drive shaft comprising:
   a tubular main shaft having an end;
   an annular end fitting disposed coaxially with said main shaft, and having an end abutting said shaft end at a joint; and
   a collar bridging said shaft and fitting at said joint, and metallurgically bonded thereto for carrying torsional, tensile, and bending loads across said joint.

2. A drive shaft according to claim 1 wherein said main shaft comprises:
   a tubular core; and
   radially outer and inner shells integrally bonded to said core.

3. A drive shaft according to claim 2 wherein said collar comprises:
   a tubular core; and
   radially outer and inner shells integrally bonded to said collar core.

4. A drive shaft according to claim 3 wherein:
   said shaft core and said collar core are metal matrix composites;

said shaft shells and said collar shells are monolithic metal; and said fitting is monolithic metal.

5. A drive shaft according to claim 4 wherein:

said shaft and fitting have a common outer diameter at said joint;

said collar has an inner diameter substantially equal thereto and surrounds said shaft and fitting; and said shaft, fitting, and collar are integrally bonded together in a unitary assembly.

6. A drive shaft according to claim 5 wherein said shaft and collar cores comprise reinforcing fibers in an integral metal matrix.

7. A drive shaft according to claim 5 wherein said shaft, fitting, and collar are bonded together in a hot isostatically pressed bond.

8. A drive shaft according to claim 5 wherein said collar outer shell is thicker than said shaft outer shell for providing a machinable land for balancing said drive shaft.

9. A drive shaft according to claim 5 wherein said shaft end and said fitting end are complementarily beveled.

10. A drive shaft according to claim 5 wherein said fitting is tubular and has a common inner diameter with said main shaft.

11. A drive shaft according to claim 5 wherein said end fitting defines a first fitting bonded to one end of said main shaft by said collar, and further comprising another one of said end fitting defining a second fitting bonded to an opposite end of said main shaft using another one of said collar.

12. A drive shaft according to claim 5 further comprising:

a fan rotor fixedly joined to said second fitting; and a turbine rotor fixedly joined to said first fitting.

13. A method of making the drive shaft of claim 1 comprising:

joining together said end fitting and main shaft at said joint;

positioning said collar across said joint; and bonding together said main shaft, end fitting, and collar.

14. A method according to claim 13 wherein said main shaft, end fitting, and collar are hot isostatically pressed together.

15. A method according to claim 13 further comprising machining said shaft outer shell and collar inner shell to substantially equal diameters prior to assembly thereof.

16. A method according to claim 13 further comprising machining said collar outer shell for balancing said drive shaft.

17. A gas turbine engine drive shaft comprising:

a tubular main shaft having an end, and including a tubular core, and radially outer and inner shells integrally bonded to said core;

an annular end fitting disposed coaxially with said main shaft, and having an end bonded to and abutting said shaft end at a joint; and a collar bridging said shaft and fitting at said joint, and metallurgically bonded thereto for carrying torsional, tensile, and bending loads across said joint, and including a tubular core and radially outer and inner shells integrally bonded to said collar core.

18. A drive shaft according to claim 17 wherein;

said shaft core and said collar core are metal matrix composites;

said shaft shells and said collar shells are monolithic metal; and said fitting is monolithic metal.

19. A drive shaft according to claim 18 wherein said shaft and collar cores comprise reinforcing fibers in an integral metal matrix.

20. A drive shaft according to claim 19 wherein:

said shaft and fitting have common outer diameters at said joint, and common inner diameters thereat;

said collar has an inner diameter substantially equal to said common outer diameter and surrounds said shaft and fitting; and said shaft, fitting, and collar are integrally bonded together in a unitary assembly.

* * * * *